United States Patent
Xu et al.

(10) Patent No.: US 9,759,984 B1
(45) Date of Patent: Sep. 12, 2017

(54) ADJUSTABLE SOLID FILM CAMERA APERTURE

(71) Applicant: Apple Inc., Cupertino, CA (US)

(72) Inventors: Tingjun Xu, San Jose, CA (US); Jeffrey Nathan Gleason, San Francisco, CA (US); Zhenbin Ge, Campbell, CA (US); Linsen Bie, Fremont, CA (US); Ligang Wang, San Jose, CA (US); Wookyung Bae, Santa Clara, CA (US); Sunggu Kang, San Jose, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 15/169,497

(22) Filed: May 31, 2016

(51) Int. Cl.
| | |
|---|---|
| *H04N 5/238* | (2006.01) |
| *G03B 9/02* | (2006.01) |
| *G02B 13/00* | (2006.01) |
| *G02F 1/153* | (2006.01) |
| *H04N 5/225* | (2006.01) |

(52) U.S. Cl.
CPC .............. *G03B 9/02* (2013.01); *G02B 13/001* (2013.01); *G02F 1/153* (2013.01); *H04N 5/2254* (2013.01); *H04N 5/2257* (2013.01)

(58) Field of Classification Search
None
See application file for complete search history.

(56) References Cited

U.S. PATENT DOCUMENTS

| | | | |
|---|---|---|---|
| 3,955,208 A | 5/1976 | Wick et al. | |
| 4,054,890 A | 10/1977 | Shimomura | |
| 4,218,120 A | 8/1980 | Kawamura et al. | |
| 4,400,072 A | 8/1983 | Suzuki et al. | |

(Continued)

FOREIGN PATENT DOCUMENTS

| | | |
|---|---|---|
| EP | 0257675 | 3/1988 |
| FR | 2 495 420 A1 | 6/1982 |

(Continued)

OTHER PUBLICATIONS

PCT International Search Report and Written Opinion of the International Searching Authority for PCT/US2014/010235 mailed Apr. 2, 2014, 12 pages.

(Continued)

*Primary Examiner* — Stephen Coleman
(74) *Attorney, Agent, or Firm* — Blakely Sokoloff Taylor & Zafman LLP (57) ABSTRACT

A portable electronic device has a device housing, and an electronic camera module in the device housing. The module has a focusing lens to focus light from a scene, an imaging sensor to receive the focused light, and an electro-optic variable aperture to allow different amounts of the light from the scene to reach the imaging sensor. The electro-optic variable aperture may include a first aperture stack placed on a transparent substrate and a second aperture stack placed on the first aperture stack. The first aperture stack defines a first aperture and the second aperture stack defines a second aperture that is larger than the first aperture. Each aperture (Continued)

stack includes a transparent conductive oxide layer that is common with the adjacent aperture stack. Alternatively the electro-optic variable aperture may include an aperture stack that has two transparent conductive oxide layer layers, where one layer is in the form of concentric annuli.

20 Claims, 4 Drawing Sheets

(56) References Cited

U.S. PATENT DOCUMENTS

| | | |
|---|---|---|
| 4,526,454 A | 7/1985 | Suzuki et al. |
| 5,471,339 A | 11/1995 | Ise et al. |
| 6,426,492 B1 | 7/2002 | Bos et al. |
| 6,621,616 B1 | 9/2003 | Bauer et al. |
| 7,477,310 B2 | 1/2009 | Makii |
| 7,585,122 B2 | 9/2009 | Eromaki |
| 2003/0125080 A1 | 7/2003 | Shimamura |
| 2004/0047050 A1 | 3/2004 | Bauer et al. |
| 2007/0133983 A1 | 6/2007 | Traff |
| 2007/0139792 A1 | 6/2007 | Sayag |
| 2007/0216803 A1 | 9/2007 | Eromaki |
| 2007/0242201 A1 | 10/2007 | Hyatt |
| 2009/0161239 A1 | 6/2009 | Verhaar et al. |
| 2010/0134866 A1 | 6/2010 | Foller et al. |
| 2012/0019713 A1 | 1/2012 | Gudlavalleti et al. |
| 2012/0249829 A1 | 10/2012 | Izuha et al. |
| 2013/0016188 A1 | 1/2013 | Ogasahara |
| 2013/0215489 A1 | 8/2013 | Blackburn et al. |
| 2014/0192256 A1 | 7/2014 | Gleason et al. |
| 2014/0192257 A1 | 7/2014 | Gleason et al. |
| 2015/0241751 A1 | 8/2015 | Noble et al. |

FOREIGN PATENT DOCUMENTS

| | | |
|---|---|---|
| JP | H05-346594 | 12/1993 |
| JP | H06-148593 | 5/1994 |
| JP | H06 317815 A | 11/1994 |
| JP | 2009116258 | 5/2009 |
| WO | WO0049455 | 8/2000 |
| WO | WO2009038265 A1 | 3/2009 |
| WO | WO2010065713 A1 | 6/2010 |

OTHER PUBLICATIONS

Non-Final Office Action (dated Jun. 18, 2015), U.S. Appl. No. 14/146,259, filed Jan. 2, 2014, First Named Inventor: Jeffrey Nathan Gleason, 16 pages.

Non-Final Office Action (dated Jun. 25, 2015), U.S. Appl. No. 14/146,521, filed Jan. 2, 2014, First Named Inventor: Jeffrey Nathan Gleason, 15 pages.

PCT International Preliminary Report on Patentability and Written Opinion (dated Jul. 16, 2015), International Application No. PCT/US2014/010235, International Filing Date Jan. 3, 2014, 9 pages.

Final Office Action (dated Nov. 5, 2015), U.S. Appl. No. 14/146,521, filed Jan. 2, 2014, First Named Inventor: Jeffrey Nathan Gleason, (10 Pages).

Non-Final Office Action dated Sep. 7, 2016 for U.S. Appl. No. 15/003,476.

"Advancement of Electrochromic Windows", *PIER Final Project Report*, Prepared for: California Energy Commission, Prepared by: Lawrence Berkeley National Laboratory, Apr. 2006, CEC-500-2006-052, 101 pages.

Deutschmann, T. et al., "Integrated electrochromic iris device for low power and space-limited applications", IOP Publishing, J. Opt. vol. 16, 5pp, 2014.

Deutschmann, T. et al., "Integrated electrochromic aperture diaphragm" SPIE Proceedings, Micro-Optics 2014, vol. 9130, 7 pages, May 2, 2014, Paper Abstract.

Office Action for U.S. Appl. No. 15/003,476 dated Mar. 24, 2017.

ADJUSTABLE SOLID FILM CAMERA APERTURE

BACKGROUND

Field

Embodiments of the invention relate to the field of camera apertures; and more specifically, to a variable solid-state aperture for a camera that may be integrated within a portable consumer electronics device.

Background

Camera modules have been incorporated in a variety of consumer electronics devices, such as smart phones, mobile audio players, personal digital assistants, laptop and tablet computers, as well as desktop personal computers. A typical digital camera module is an assembly in which at least the following components have been integrated: a microelectronic imaging sensor integrated circuit chip, a printed circuit carrier such as a flexible circuit structure which carries power and signal connections between the sensor chip and other circuitry inside the consumer electronics device, and an optical system which includes a fixed focal length lens subsystem or autofocus lens subsystem. There may be additional optical elements such as infrared filters and neutral density filters. Typically, in most consumer electronics portable devices such as smart phones and tablet computers, which have a relatively thin profile (or a so-called shallow z-height), the various optical path apertures in the optical system are of the fixed variety. That is in part because conventional variable apertures that use leaflets for example are not only complex (adding to the cost of the device as a whole) and more susceptible to physical shock or damage, but they also require additional headroom in the z-height direction, thereby leading to a thicker smartphone or tablet computer.

There has been a suggestion to use an electro-optic aperture in an imaging system, in order to avoid the use of moving parts while at the same time achieving improved focusing and greater depth of field. The electro-optic aperture may include an electro-chromic (EC) medium that attenuates light from the scene that is passing through the aperture, in response to a voltage being applied to a pair of transparent conductor layers between which the EC medium is sandwiched. An abrupt void or gap is formed in one of the transparent conductor layers, so as to form a ring-like aperture whose inner area remains transparent when the EC medium is energized and whose outer area becomes dark, thereby yielding in effect a smaller pupil. The electro-optic aperture may be positioned between a focusing lens of the system and the scene being imaged.

SUMMARY

An embodiment of the invention is a portable consumer electronics device having a hand held portable device housing, and an electronic camera module that is integrated in the housing. The module has a focusing lens to focus light from a scene, and an imaging sensor to receive the focused light. An electro-optic variable aperture is provided to allow different amounts of light from the scene to reach the imaging sensor (through the focusing lens).

The electro-optic variable aperture may include a first aperture stack placed on a transparent substrate and a second aperture stack placed on the first aperture stack. The first aperture stack defines a first aperture to control the amount of light that reaches the imaging sensor. The second aperture stack defines a second aperture that admits more light than the first aperture. Some or all of the layers in each aperture stack may have material removed to create an opening that defines the aperture.

Each aperture stack after the first includes a transparent conductive oxide layer that is common with the adjacent aperture stack. The transparent conductive oxide layer that is common with the adjacent aperture stack may have material removed to define the smaller of the two apertures. Since the common conductive oxide layer is transparent, removing material to define the smaller of the two apertures does not affect defining of the larger of the two apertures by the remaining layers of the aperture stack.

Alternatively the electro-optic variable aperture may include an aperture stack that has two transparent conductive oxide layer layers, where one layer is in the form of concentric annuli.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary. Other features and advantages of the present invention will be apparent from the accompanying drawings and from the detailed description that follows below.

BRIEF DESCRIPTION OF THE DRAWINGS

The invention may best be understood by referring to the following description and accompanying drawings that are used to illustrate embodiments of the invention by way of example and not limitation. In the drawings, in which like reference numerals indicate similar elements.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description.

In the following description, reference is made to the accompanying drawings, which illustrate several embodiments of the present invention. It is understood that other embodiments may be utilized, and mechanical compositional, structural, electrical, and operational changes may be made without departing from the spirit and scope of the present disclosure. The following detailed description is not to be taken in a limiting sense, and the scope of the embodiments of the present invention is defined only by the claims of the issued patent.

The terminology used herein is for the purpose of describing particular embodiments only and is not intended to be limiting of the invention. Spatially relative terms, such as "beneath", "below", "lower", "above", "upper", and the like may be used herein for ease of description to describe one element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (e.g., rotated 90 degrees or at other orientations) and the spatially relative descriptors used herein interpreted accordingly.

As used herein, the singular forms "a", "an", and "the" are intended to include the plural forms as well, unless the context indicates otherwise. It will be further understood that the terms "comprises" and/or "comprising" specify the presence of stated features, steps, operations, elements, and/or components, but do not preclude the presence or addition of one or more other features, steps, operations, elements, components, and/or groups thereof.

The terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

Several embodiments of the invention with reference to the appended drawings are now explained. Whenever the shapes, relative positions and other aspects of the parts described in the embodiments are not clearly defined, the scope of the invention is not limited only to the parts shown, which are meant merely for the purpose of illustration. Also, while numerous details are set forth, it is understood that some embodiments of the invention may be practiced without these details. In other instances, well-known circuits, structures, and techniques have not been shown in detail so as not to obscure the understanding of this description.

Figure 1:
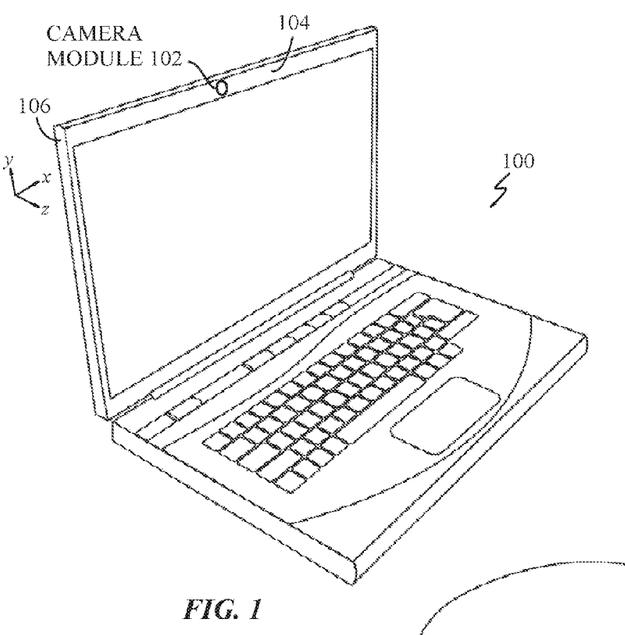
FIG. 1 depicts a portable consumer electronics device in which a camera module having an electro-optic variable aperture is integrated.

Referring now to FIG. 1, a perspective view of a portable electronic device 100 in which an electronic camera module 102 is integrated. The portable electronic device 100 in this case may be a laptop or notebook computer. Of course, the electronic camera module may alternatively be integrated in other types of portable electronic devices, such as smart phones or tablet computers, and it may also be integrated within non-portable electronic devices such as desktop personal computers, television monitors, or any other electronic device that has a particularly short profile in the Z-axis (Z-height).

In the case of the laptop or notebook computer, the device 100 may have a display screen in a device housing that may provide a bezel 104 surrounding the display screen. The device housing may have a Z-height 106 in the range of 8 mm or less, thereby being particularly suited to receive therein a camera module that has a Z-height within the range of 6 mm or less. The adjustable camera apertures described herein are suitable for creating compact lens systems having a small Z-height.

Figure 2:
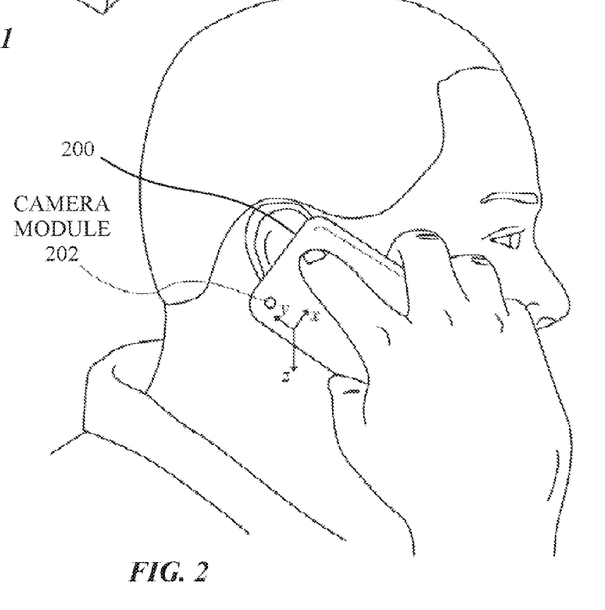
FIG. 2 depicts another portable consumer electronics device in which a camera module having an electro-optic variable aperture is integrated.

FIG. 2 depicts another example portable electronic device 200 in use by the end user, and in which an electronic camera module 202 is integrated. In this example, the portable electronic device is a smart phone having a surface that is up against an ear of the user during a phone call that is being conducted. One surface of the device has an opening through which the camera module 202 collects light to form an image. The opening for the camera may be in the same surface that is held to the ear or a different surface. The camera module 202 may alternatively be integrated within other portable electronic devices. The camera module 202 could also be integrated in non-portable electronic devices and in particular those where the so-called thickness or z-height or depth of the external housing is limited, making it difficult to use a mechanically variable aperture. An embodiment of the invention is an electronic camera module that includes an electro-optic (EO) variable aperture. The electronic camera module may have a small Z-height that is particularly suitable for use in the tight confines of portable electronic devices.

Figure 3:
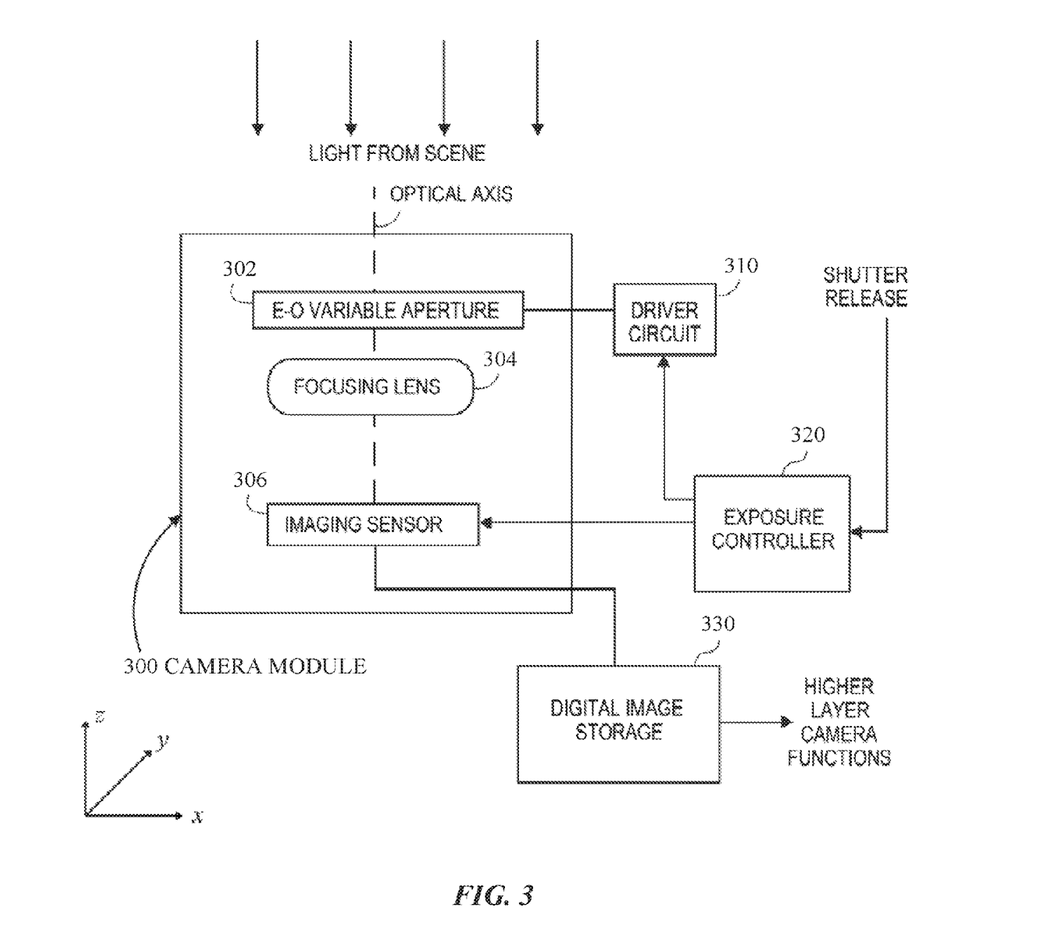
FIG. 3 is a block diagram of camera-related elements including a camera module and associated electronics circuitry.

FIG. 3 is a block diagram of a camera module 300 similar to those shown in FIGS. 1 and 2 together with electronic circuit elements that are needed to implement the camera function. Note that there may be additional functions that are implemented in the portable electronic device as is known to those of ordinary skill in the art but that are not described here in the interest of conciseness, e.g. communication network interfaces, display screens, touch screens, keyboards, and audio transducers. The electronic camera module 300 has an imaging sensor 306 that is part of an optical system, which also includes a focusing lens 304 and an electro-optic variable aperture 302. These optical elements are aligned to an optical axis as shown. Note however, that while in this particular example all of the optical elements are in a straight line, in other embodiments there may be a mirror or other optical deflector that allows one or more of the elements to be positioned off of a straight line. Nevertheless, those elements may still be considered "aligned with the optical axis." What is shown in FIG. 3 is a particularly efficient mechanism (in terms of packaging) that can fit within the tight confines of a low z-height portable electronic device such as a smart phone, a tablet computer, or a laptop computer, where, in particular, all of the optical interfaces are positioned substantially parallel to a front or rear face of the external housing of the device. In other words, each optical element lies flat within an x-y plane with its height given in the z-direction shown.

The imaging sensor 306 may be any conventional solid-state imaging sensor such as a complementary metal oxide semiconductor (CMOS) sensor chip, which presents an interface to an exposure controller 320 to receive certain parameters for determining an exposure for taking a picture. The sensor parameters may include pixel integration time, which may be set by the exposure controller 320 in accordance with any suitable exposure control algorithm that considers various input variables (e.g., level of scene illumination and the availability of a flash or strobe illumination). The exposure controller 320 may automatically perform the algorithm to determine an appropriate exposure setting, and then signal the imaging sensor to update its parameters in response to a manual shutter release command (e.g., in response to a mechanical or virtual shutter button being fully actuated by a user of the device). The exposure controller 320 may be implemented as a programmed processor or as a completely hardwired logic state machine together with stored parameter options. Once a digital image has been captured by the imaging sensor 306 under the chosen exposure setting, it may be transferred to a digital image storage 330 (e.g., solid state volatile or non-volatile memory), prior to being further processed or analyzed by higher layer camera functions that yield for example a still picture file (e.g., in a JPEG format) or a video file (e.g., in a digital movie format).

Also included in the electronic camera module 300 is a focusing lens 304 which may include one or more lens elements that serve to focus light from the scene onto the imaging sensor 306 (thereby producing an optical image on an active pixel array portion of the imaging sensor 306). The focusing lens 304 may include either a fixed focus optical subsystem, or a variable focus subsystem. A variable focus subsystem may include an autofocus mechanism. There may also be an optical zoom mechanism, as part of the focusing lens 304. In the case of an optical zoom lens and/or an auto focus mechanism, additional control parameters relating to lens position can be set by the exposure controller 320 for each exposure to be taken, as is apparent to those of ordinary skill in the art.

The electronic camera module 300 also has the electro-optic variable aperture 302, which for the sake of simplicity is shown as being positioned in front of the focusing lens 304. The electro-optic variable aperture 302 effectively implements a pupil whose width or size is electrically variable. The aperture 302 may be positioned at any suitable aperture location along the optical axis in front of the imaging sensor 306. When the aperture 302 has been electrically controlled into a small or narrow pupil, highly collimated rays are admitted by it, which results in a sharp focus at an image plane of the optical system. On the other hand, when the aperture 302 is configured into a large or wide pupil, un-collimated rays are admitted resulting in an optical image that is sharp around what the focusing lens 304 is focusing on, and may be blurred otherwise. The aperture 302 thus determines how collimated the admitted rays of light from the scene are, that ultimately come to a focus in an image plane. The aperture 302 also determines the amount of incident light or how many incoming rays are admitted, and thus how much light reaches the imaging sensor, where of course the narrower the aperture the darker the digital image that is captured by the sensor 306 (for a given integration time). Control of the effective pupil size of the aperture 302 is achieved using an electronic driver circuit 310, which may receive a control signal or command from the exposure controller 320 that may represent the desired size of the effective pupil. The driver circuit 310 translates this input command into a drive voltage that is applied to the input transparent conductors of the aperture 302, as described below.

Figure 4A:
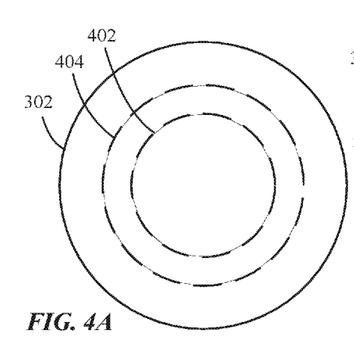
FIGS. 4A, 4B, and 4C are plan views of an electro-optic variable aperture in several operational states in accordance with an embodiment of the invention.
Figure 4B:
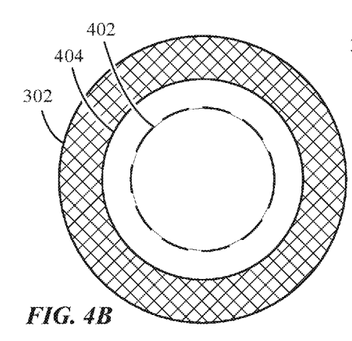
Figure 4C:
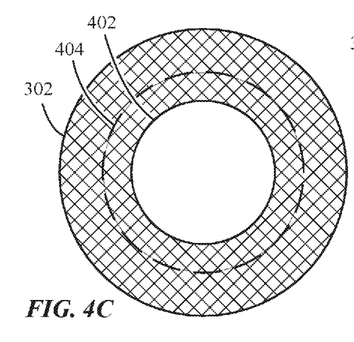
Figure 5A:
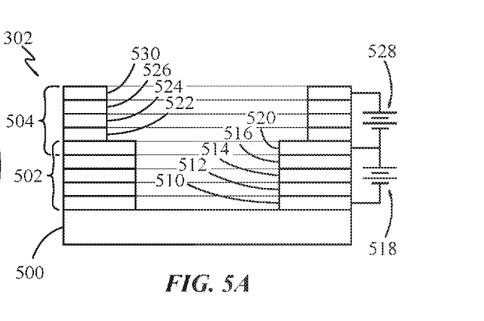
FIGS. 5A, 5B, and 5C are section views of the electro-optic variable aperture of FIGS. 4A, 4B, and 4C respectively taken along a diameter of the electro-optic variable aperture.
Figure 5B:
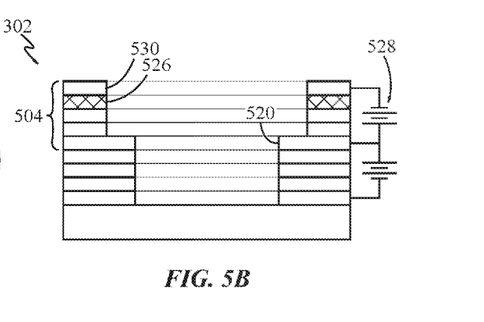
Figure 5C:
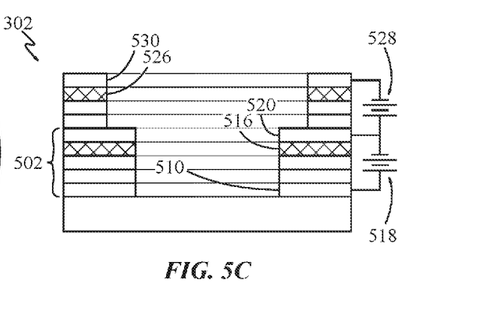

FIGS. 4A, 4B, and 4C are plan views of the active portion of an embodiment of the electro-optic variable aperture 302 used in the camera module 300 shown in FIG. 3. FIGS. 5A, 5B, and 5C are section views of the active portion of this embodiment of the electro-optic variable aperture 302 taken along diameters of FIGS. 4A, 4B, and 4C respectively.

As may be seen in FIG. 5A, the electro-optic variable aperture 302 includes a first aperture stack 502 placed on a transparent substrate 500. A second aperture stack 504 is placed on the first aperture stack 502. In other embodiments additional aperture stacks may be included with each additional aperture stack being placed on a preceding aperture stack in the same way as the second aperture stack 504 is placed on the first aperture stack 502.

As may be seen in FIG. 4A, each aperture stack defines a central opening or aperture to control the amount of light that reaches the imaging sensor. The first aperture stack 502 defines a first aperture 402. The second aperture stack 504 defines a second aperture 404 that is admits more light than the first aperture 402. In other embodiments with additional aperture stacks, each successive aperture stack defines an aperture that is admits more light than the preceding aperture. In some embodiments, the electro-chromic layer has an annular shape and the inside diameter of the annulus defines the aperture in each aperture stack. Annular is intended to be used in the broad sense of a region bounded by two concentric regular polygons as well as a region bounded by two concentric circles as shown in the Figures.

Referring again to FIG. 5A, each aperture stack 502, 504 includes a first transparent conductive oxide layer 510, 520, a counter electrode layer 512, 522, an ion conductor layer 514, 524, an electro-chromic layer 516, 526, and a second transparent conductive oxide layer 520, 530. The first transparent conductive oxide layer 510 of the first aperture stack 502 is deposited on the transparent substrate 500. The first transparent conductive oxide layer 520 of the second aperture stack 504 is also the second transparent conductive oxide layer of the first aperture stack 502. In some embodiments, the first transparent conductive oxide layer, the counter electrode layer, the ion conductor layer, the electro-chromic layer, and the second transparent conductive oxide layer are each a solid film in each aperture stack. The solid films may be fabricated using semiconductor fabrication methods, such as various deposition and patterning processes.

The thickness of the layers in the aperture stacks has been greatly exaggerated for clarity. Each of the solid films in the aperture stack may be less than 0.4 µm thick. The total thickness of all the solid film layers in the aperture stack may be less than 1 µm. When the aperture stack is built on a transparent substrate, the thickness of the substrate will be the defining factor for the total thickness of the device. Glass substrates can be 0.2 mm thick or less. The aperture can be built on top of other optical devices in a lens, so the total thickness added to the lens by the aperture stack could be less than 1 um.

In other embodiments with additional aperture stacks, the first transparent conductive oxide layer of each successive aperture stack is also the second transparent conductive oxide layer of the preceding aperture stack. In other words, the second and all successive aperture stacks share a common transparent conductive oxide layer with the preceding aperture stack. The transparent conductive oxide layer that is common with the adjacent aperture stack may have material removed to define the smaller of the two apertures. Since the common conductive oxide layer is transparent, removing material to define the smaller of the two apertures does not affect defining of the larger of the two apertures by the remaining layers of the aperture stack. In some embodiments, portions of a layer may be replaced by transparent material rather than being removed to define an aperture.

In the embodiment shown in FIGS. 5A-5C, the second transparent conductive oxide layer 520 of the first aperture stack 502 is deposited on the electro-chromic layer 516 of the first aperture stack. Further, the second transparent conductive oxide layer 530 of the second aperture stack 504 is deposited on the electro-chromic layer 526 of the second aperture stack. In other embodiments (not shown) the second transparent conductive oxide layer of one or both stacks may be deposited on the first transparent conductive oxide layer.

In the embodiment shown in FIGS. 5A-5C, the counter electrode layer 512, 522 is deposited on the first transparent conductive oxide layer 510, 520, the ion conductor layer 514, 524 is deposited on the counter electrode layer, the electro-chromic layer 516, 526 is deposited on the ion conductor layer, and the second transparent conductive oxide layer 520, 530 is deposited on the electro-chromic layer in each aperture stack. In other embodiments (not shown) the order of the layers of one or both stacks may be reversed so that the electro-chromic layer is deposited on the first transparent conductive oxide layer, the ion conductor layer is deposited on the electro-chromic layer, the counter electrode layer is deposited on the ion conductor layer, and the second transparent conductive oxide layer is deposited on the counter electrode layer.

Electrical potentials 518, 528 are applied to the first transparent conductive oxide layer 510, 520 and the second transparent conductive oxide layer 520, 530 of each aperture stack 502, 504. While the potentials are illustrated as being applied by batteries for simplicity and clarity, the potentials may be supplied by an appropriate electronic circuit that includes provisions for controlling the magnitude and/or polarity of the potentials being applied.

Applying a first electrical potential between the first transparent conductive oxide layer 510, 520 and the second transparent conductive oxide layer 520, 530 causes the electro-chromic layer 516, 526 to become opaque. Applying a second electrical potential between the first transparent conductive oxide layer 510, 520 and the second transparent conductive oxide layer 520, 530 causes the electro-chromic layer 516, 526 to become transparent. In one embodiment, the first electrical potential and the second electrical potential have opposite polarities. It will be appreciated that "opaque" is used herein to mean that at least 90% of the incident image forming light is blocked by an opaque electro-chromic layer. "Transparent" is used herein to mean that no more than 10% of the incident image forming light is blocked by a transparent electro-chromic layer.

As shown in FIG. 4A, when the electro-chromic layer 516, 526 in both aperture stacks 502, 504 is transparent, the electro-optic variable aperture 302 provides the largest aperture and the least reduction of light passing through the electro-optic variable aperture.

As shown in FIG. 4B, when the first electro-chromic layer 516 in the first aperture stack 502 is transparent and the second electro-chromic layer 526 in the second aperture stack 504 is opaque, the electro-optic variable aperture 302 provides the second largest aperture and a moderate reduction of light passing through the electro-optic variable aperture.

As shown in FIG. 4C, when the first electro-chromic layer 516 in the first aperture stack 502 is opaque, the electro-optic variable aperture 302 provides the smallest aperture and the greatest reduction of light passing through the electro-optic variable aperture. It will be appreciated that the second electro-chromic layer 526 in the second aperture stack 504 may be transparent or opaque when the first electro-chromic layer 516 in the first aperture stack 502 is opaque. In other embodiments with additional aperture stacks, additional degrees of light reduction will be provided.

Figure 6A:
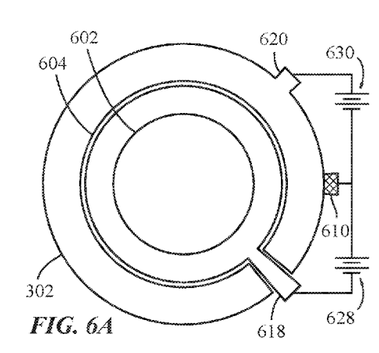
FIGS. 6A, 6B, and 6C are plan views of an electro-optic variable aperture in several operational states in accordance with another embodiment of the invention.
Figure 6B:
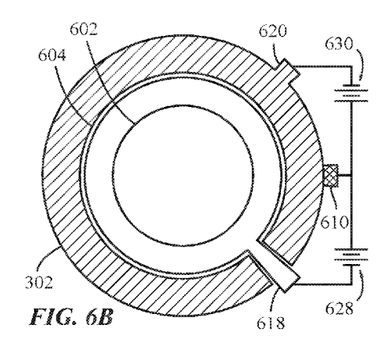
Figure 6C:
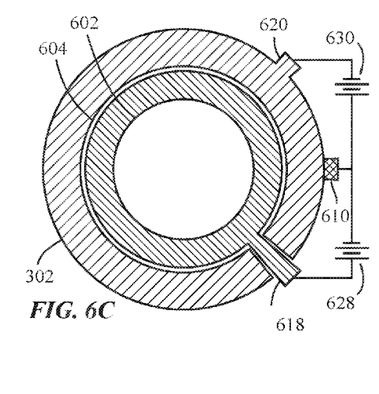
Figure 7:
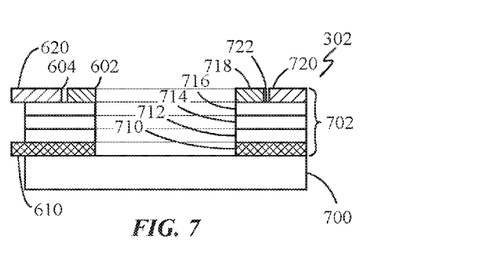
FIG. 7 is a section view of the electro-optic variable aperture of FIGS. 6A, 6B, and 6C taken along a diameter of the electro-optic variable aperture.

FIGS. 6A, 6B, and 6C are plan views of the active portion of another embodiment of the electro-optic variable aperture 302 used in the camera module 300 shown in FIG. 3. FIG. 7 is a section view of the active portion of this embodiment of the electro-optic variable aperture 302 taken along a diameter of FIG. 6C.

As may be seen in FIG. 7, this embodiment of the electro-optic variable aperture 302 includes a single aperture stack 702 placed on a transparent substrate 700. The aperture stack 702 includes a first transparent conductive oxide layer 710, an electro-chromic layer 712, an ion conductor layer 714, a counter electrode layer 716, and a second transparent conductive oxide layer that is divided into two electrically isolated areas 718, 720. In other embodiments (not shown), the second transparent conductive oxide layer may be divided into more than two electrically isolated areas. In some embodiments, the first transparent conductive oxide layer, the electro-chromic layer, the ion conductor layer, the counter electrode layer, and the second transparent conductive oxide layer are each a solid film layer. The thickness of the layers in the aperture stack has been greatly exaggerated for clarity. The total thickness of all the solid film layers in the aperture stack may be less than 1 μm.

As may be seen in FIG. 6A, the aperture stack 702 defines a central aperture 602. The first transparent conductive oxide layer 710, the electro-chromic layer 712, the ion conductor layer 714, and the counter electrode layer 716, may each in the form of an annulus having the same size and shape. Annulus is intended to be used in the broad sense of a region bounded by two concentric regular polygons as well as a region bounded by two concentric circles as shown in the figures.

The second transparent conductive oxide layer is divided into two electrically isolated areas 718, 720 that are generally in the form of concentric annuli. As may be seen in the figures, the outer annulus 720 may be interrupted by an electrical path extending from the inner annulus 718 to an electrical connection 618 on the outer periphery of the electro-optic variable aperture 302. Additional electrical connections 610, 620 may be provided on the outer periphery of the electro-optic variable aperture 302 for the first transparent conductive oxide layer and for the outer annulus 720 of the second transparent conductive oxide layer.

Figure 8:
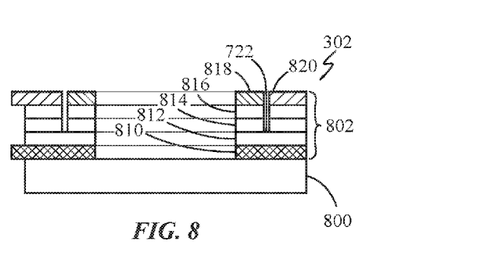
FIG. 8 is a section view of an electro-optic variable aperture taken along a diameter of the electro-optic variable aperture in accordance with another embodiment of the invention.

In the embodiments of the electro-optic variable aperture shown in FIGS. 7 and 8, the first transparent conductive oxide layer 710, 810 is deposited on the transparent substrate 700, 800, the electro-chromic layer 712, 812 is deposited on the first transparent conductive oxide layer, the ion conductor layer 714, 814 is deposited on the electro-chromic layer, the counter electrode layer 716, 816 is deposited on the ion conductor layer, and the second transparent conductive oxide layer 718, 720, 818, 820 is deposited on the counter electrode layer.

A gap 722, 822 separates the second transparent conductive oxide layer into the inner annulus 718 and the outer annulus 720. The gap 722, 822 electrically isolates the inner annulus 718 from the outer annulus 720. The gap 722, 822 extends through the second transparent conductive oxide layer. In some embodiments, such as the embodiment shown in FIG. 8, the gap 822 extends into one or more of the counter electrode layer 816, the ion conductor layer 814, and the electro-chromic layer 812.

Figure 9:
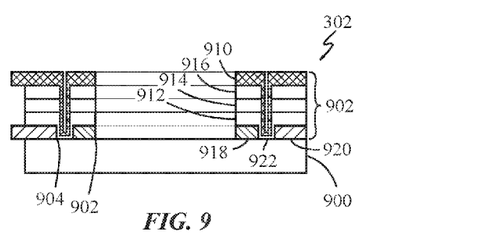
FIG. 9 is a section view of an electro-optic variable aperture taken along a diameter of the electro-optic variable aperture in accordance with yet another embodiment of the invention.

FIG. 9 is a section view of the active portion of another embodiment of an electro-optic variable aperture 302 having a single aperture stack 902. The section is taken along a diameter of the electro-optic variable aperture.

As may be seen in FIG. 9, this embodiment of the electro-optic variable aperture 302 includes a single aperture stack 902 placed on a transparent substrate 900. The aperture stack 902 includes a first transparent conductive oxide layer 910, an electro-chromic layer 912, an ion conductor layer 914, a counter electrode layer 916, and a second transparent conductive oxide layer that is divided into two electrically isolated areas 918, 920. In other embodiments (not shown), the second transparent conductive oxide layer may be divided into more than two electrically isolated areas. In some embodiments, the first transparent conductive oxide layer, the electro-chromic layer, the ion conductor layer, the counter electrode layer, and the second transparent conductive oxide layer are each a solid film layer. The thickness of the layers in the aperture stack has been greatly exaggerated for clarity. The total thickness of all the solid film layers in the aperture stack may be less than 1 μm.

In this embodiment, the divided second transparent conductive oxide layer 918, 920 is deposited on the transparent substrate 900. The electro-chromic layer 912 is deposited on the second transparent conductive oxide layer 918, 920. It will be seen that the electro-chromic layer 912 extends to the transparent substrate 900 in the gap between the two areas 918, 920 of the second transparent conductive oxide layer to provide electrical isolation of the two areas 918, 920 from each other and from the first transparent conductive oxide layer 910.

In this embodiment, the ion conductor layer 914 is deposited on the electro-chromic layer 912, the counter electrode layer 916 is deposited on the ion conductor layer, and the first transparent conductive oxide layer 910 is deposited on the counter electrode layer. A gap is formed in the ion conductor layer 914 and the counter electrode layer 916 that corresponds to the gap between the two areas 918, 920 of the second transparent conductive oxide layer. The first transparent conductive oxide layer 910 extends across this gap and is deposited on the electro-chromic layer 912 in this gap.

Figure 10:
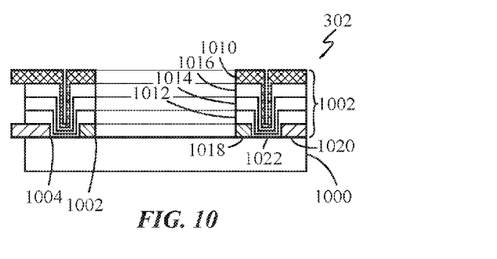
FIG. 10 is a section view of an electro-optic variable aperture taken along a diameter of the electro-optic variable aperture in accordance with still another embodiment of the invention.

FIG. 10 is a section view of the active portion of yet another embodiment of an electro-optic variable aperture 302 having a single aperture stack 1002. The section is taken along a diameter of the electro-optic variable aperture.

As may be seen in FIG. 10, this embodiment of the electro-optic variable aperture 302 includes a single aperture stack 1002 placed on a transparent substrate 1000. The aperture stack 1002 includes a first transparent conductive oxide layer 1010, an electro-chromic layer 1012, an ion conductor layer 1014, a counter electrode layer 1016, and a second transparent conductive oxide layer that is divided into two electrically isolated areas 1018, 1020. In other embodiments (not shown), the second transparent conductive oxide layer may be divided into more than two electrically isolated areas. In some embodiments, the first transparent conductive oxide layer, the electro-chromic layer, the ion conductor layer, the counter electrode layer, and the second transparent conductive oxide layer are each a solid film layer. The thickness of the layers in the aperture stack has been greatly exaggerated for clarity. The total thickness of all the solid film layers in the aperture stack may be less than 1 μm.

In this embodiment, the divided second transparent conductive oxide layer 1018, 1020 is deposited on the transparent substrate 1000. The electro-chromic layer 1012 is deposited on the second transparent conductive oxide layer 1018, 1020. It will be seen that the electro-chromic layer 1012 extends to the transparent substrate 1000 in the gap 1022 between the two areas 1018, 1020 of the second transparent conductive oxide layer to provide electrical isolation of the two areas 1018, 1020 from each other and from the first transparent conductive oxide layer 1010.

In this embodiment, the ion conductor layer 1014 is deposited on the electro-chromic layer 1012, the counter electrode layer 1016 is deposited on the ion conductor layer, and the first transparent conductive oxide layer 1010 is deposited on the counter electrode layer. Each of these layers extends across the gap 1022 between the two areas 1018, 1020 of the second transparent conductive oxide layer. In other embodiments (not shown) only the electro-chromic layer, one of the ion conductor layer or the counter electrode layer, and the first transparent conductive oxide layer extends across the gap between the two areas of the second transparent conductive oxide layer.

While certain embodiments have been described and shown in the accompanying drawings, it is to be understood that such embodiments are merely illustrative of and not restrictive on the broad invention, and that the invention is not limited to the specific constructions and arrangements shown and described, since various other modifications may occur to those of ordinary skill in the art. For example, while the figures show a particular order for the stack up of the various layers of the aperture 14, the positions of some of the layers can be changed while still achieving similar results. The description is thus to be regarded as illustrative instead of limiting.

What is claimed is:

1. An electro-optic variable aperture to control light that passes through an imaging path, the electro-optic variable aperture comprising:
   a first aperture stack that provides a first aperture; and
   a second aperture stack placed on the first aperture stack, the second aperture stack defining a second aperture that is larger than the first aperture;
   wherein each aperture stack includes a first transparent conductive oxide layer, a counter electrode layer, an ion conductor layer, an electro-chromic layer, and a second transparent conductive oxide layer;
   wherein the first transparent conductive oxide layer of the first aperture stack is deposited on a transparent substrate;
   wherein the first transparent conductive oxide layer of the second aperture stack is the second transparent conductive oxide layer of the first aperture stack.

2. The electro-optic variable aperture of claim 1 wherein the counter electrode layer is deposited on the first transparent conductive oxide layer, the ion conductor layer is deposited on the counter electrode layer, the electro-chromic layer is deposited on the ion conductor layer, and the second transparent conductive oxide layer is deposited on the electro-chromic layer in each aperture stack.

3. The electro-optic variable aperture of claim 1 wherein the first transparent conductive oxide layer, the counter electrode layer, the ion conductor layer, the electro-chromic layer, and the second transparent conductive oxide layer are each a solid film in each aperture stack.

4. The electro-optic variable aperture of claim 1 wherein the electro-chromic layer has an annular shape and the inside diameter of the annulus defines the aperture in each aperture stack.

5. The electro-optic variable aperture of claim 1 wherein the second transparent conductive oxide layer of the first aperture stack is deposited on the electro-chromic layer of the first aperture stack.

6. The electro-optic variable aperture of claim 5 wherein the second transparent conductive oxide layer of the second aperture stack is deposited on the electro-chromic layer of the second aperture stack.

7. The electro-optic variable aperture of claim 1 wherein a first electrical potential is applied between the first transparent conductive oxide layer and the second transparent conductive oxide layer to make the electro-chromic layer opaque, and a second electrical potential is applied between the first transparent conductive oxide layer and the second transparent conductive oxide layer to make the electro-chromic layer transparent in each aperture stack.

8. The electro-optic variable aperture of claim 7 wherein the first electrical potential and the second electrical potential have opposite polarities.

9. A portable electronic device comprising:
a device housing; and
an electronic camera module in the device housing, the electronic camera module having a focusing lens with an optical axis, an imaging sensor to receive focused light, and an electro-optic variable aperture to allow different amounts of focused light to reach the imaging sensor;
wherein the electro-optic variable aperture includes a first aperture stack placed on a transparent substrate, the first aperture stack defining a first aperture, and a second aperture stack placed on the first aperture stack, the second aperture stack defining a second aperture that is larger than the first aperture;
wherein each aperture stack includes a first transparent conductive oxide layer, a counter electrode layer, an ion conductor layer, an electro-chromic layer, and a second transparent conductive oxide layer;
wherein the first transparent conductive oxide layer of the first aperture stack is deposited on the transparent substrate;
wherein the first transparent conductive oxide layer of the second aperture stack is the second transparent conductive oxide layer of the first aperture stack.

10. The portable electronic device of claim 9 wherein the counter electrode layer is deposited on the first transparent conductive oxide layer, the ion conductor layer is deposited on the counter electrode layer, the electro-chromic layer is deposited on the ion conductor layer, and the second transparent conductive oxide layer is deposited on the electro-chromic layer in each aperture stack.

11. The portable electronic device of claim 9 wherein the first transparent conductive oxide layer, the counter electrode layer, the ion conductor layer, the electro-chromic layer, and the second transparent conductive oxide layer are each a solid film in each aperture stack.

12. The portable electronic device of claim 9 wherein the electro-chromic layer has an annular shape and the inside diameter of the annulus defines the aperture in each aperture stack.

13. The portable electronic device of claim 9 wherein the second transparent conductive oxide layer of the first aperture stack is deposited on the electro-chromic layer of the first aperture stack.

14. The portable electronic device of claim 13 wherein the second transparent conductive oxide layer of the second aperture stack is deposited on the electro-chromic layer of the second aperture stack.

15. The portable electronic device of claim 9 wherein a first electrical potential is applied between the first transparent conductive oxide layer and the second transparent conductive oxide layer to make the electro-chromic layer opaque, and a second electrical potential is applied between the first transparent conductive oxide layer and the second transparent conductive oxide layer to make the electro-chromic layer transparent in each aperture stack.

16. The portable electronic device of claim 15 wherein the first electrical potential and the second electrical potential have opposite polarities.

17. An electro-optic variable aperture to control light that passes through an imaging path, the electro-optic variable aperture comprising:
an aperture stack including
a first transparent conductive oxide layer in form of a first annulus having a first outer diameter and a first inner diameter,
a second transparent conductive oxide layer in form of a second annulus and a third annulus concentric with the second annulus, the second annulus having the first outer diameter and a second inner diameter that is larger than the first inner diameter, the third annulus having a second outer diameter that is smaller than the second inner diameter and the first inner diameter,
an electro-chromic layer,
an ion conductor layer, and
a counter electrode layer.

18. The electro-optic variable aperture of claim 17 wherein the second transparent conductive oxide layer is deposited on a transparent substrate, the electro-chromic layer is deposited on the second transparent conductive oxide layer, the ion conductor layer is deposited on the electro-chromic layer, the counter electrode layer is deposited on the ion conductor layer, and the first transparent conductive oxide layer is deposited on the counter electrode layer, wherein the electro-chromic layer electrically isolates the second annulus from the third annulus in the second transparent conductive oxide layer.

19. The electro-optic variable aperture of claim 17 wherein the first transparent conductive oxide layer is deposited on a transparent substrate, the electro-chromic layer is deposited on the first transparent conductive oxide layer, the ion conductor layer is deposited on the electro-chromic layer, the counter electrode layer is deposited on the ion conductor layer, and the second transparent conductive oxide layer is deposited on the counter electrode layer.

20. The electro-optic variable aperture of claim 19 wherein the counter electrode layer, the ion conductor layer, and the electro-chromic layer are each in the form of an annulus that has the same size and shape as the first transparent conductive oxide layer.

* * * * *